June 28, 1949.    B. N. ASHTON    2,474,772
UNLOADING VALVE
Filed Nov. 24, 1943    2 Sheets-Sheet 1
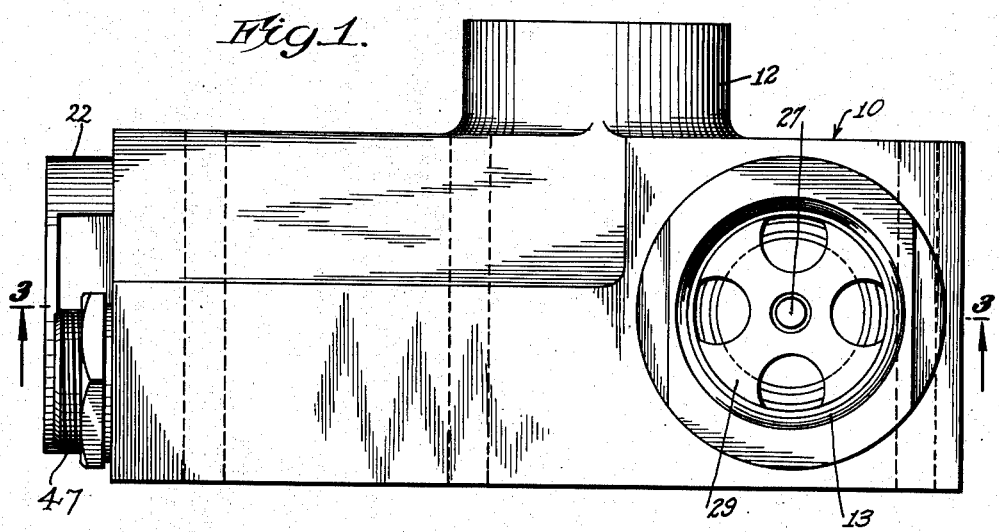
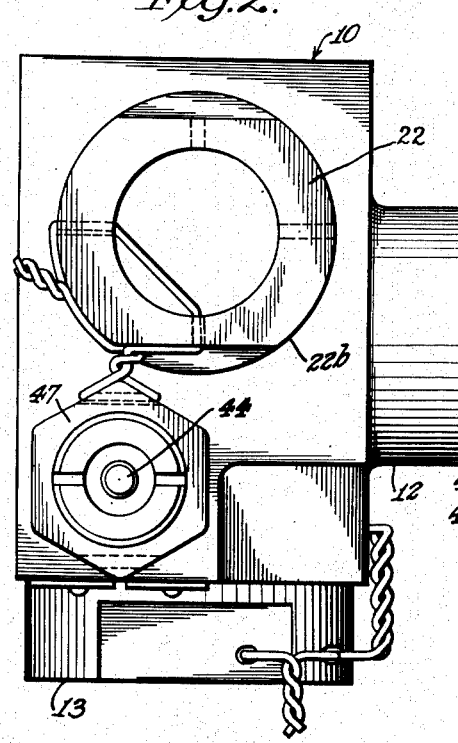
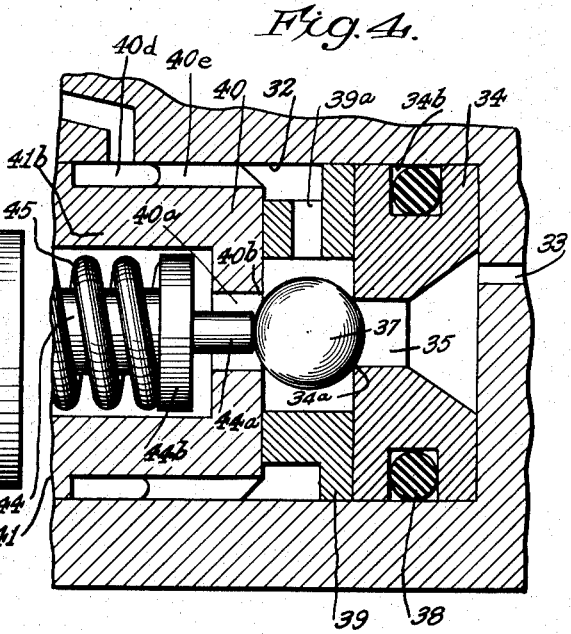
INVENTOR.
BENJAMIN N. ASHTON
BY
ATTORNEYS

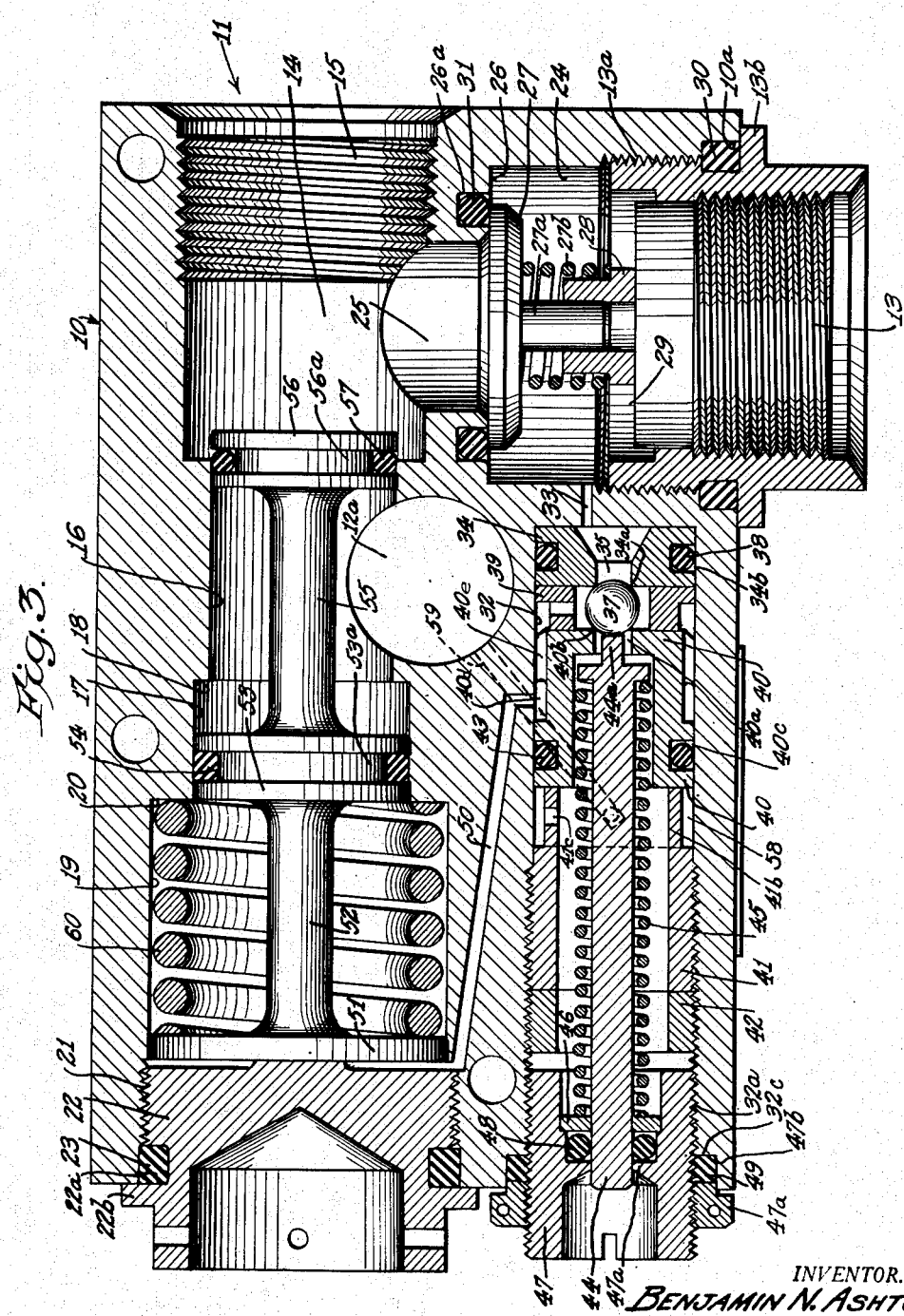

Patented June 28, 1949

2,474,772

UNITED STATES PATENT OFFICE 2,474,772

UNLOADING VALVE

Benjamin N. Ashton, Kingston, N. Y., assignor to Electrol Incorporated, Kingston, N. Y., a corporation of Delaware Application November 24, 1943, Serial No. 511,514

2 Claims. (Cl. 137—153)

This invention relates to improvements in pressure control valves for high pressure hydraulic systems and relates particularly to unloading valves for maintaining the pressure in such hydraulic systems within a predetermined pressure range.

Valves of the type embodying the present invention are particularly useful in hydraulic systems which are utilized for actuating the retractable landing gear, wing flaps, bomb bay doors and the like of airplanes. Such hydraulic systems operate usually at very high pressures, that is, between about 500 and 3000 pounds per square inch. The pressure for the system is usually supplied by a pump that is driven by the airplane motor and operates continuously during the operation of the motor. Inasmuch as the motor driven pump constantly supplies liquid under pressure, it is necessary to recirculate the liquid when the system is idle in order to prevent excessive pressures from being built up in the system and causing damage to the operating elements and conduits.

Various types of valves have been provided heretofore for controlling the return of the fluid or recirculation of the fluid in the system. An example of such a valve is disclosed in the Ashton and Kling application Serial No. 472,964, filed January 20, 1943, now Patent Number 2,397,117, granted March 26, 1946.

The unloader valve disclosed in the Ashton and Kling application Serial No. 472,964 includes a series of ball valves or poppet valves which are responsive to the pressure of the fluid supplied by the pump and to the back pressure in the system in order to cause recirculation of the fluid when a predetermined back pressure is exceeded and to increase the pressure in the system when it has dropped below a predetermined minimum.

Valves of the type disclosed in the Ashton and Kling application are very satisfactory in use, but they have the disadvantage of being relatively complicated and expensive because of the necessity of manufacturing the various elements of the valve to extremely close tolerances in order to avoid leakage at the high operating pressures.

An object of the present invention is to provide a simplified form of unloading valve which is capable of maintaining the liquid pressure in an hydraulic system within predetermined limits.

Another object of the invention is to provide a compact, simple and efficient unloading valve which is easy and inexpensive to manufacture.

Other objects of the invention will become apparent from the following description of typical forms of valves embodying the present invention.

In accordance with the present invention, an unloading valve is provided including a check valve which is opened in response to the pressure of fluid delivered thereagainst, a spring balanced valve which is responsive to the pressure of fluid delivered to the system and to back pressure of the fluid in the system which controls another valve for bypassing the fluid back to the supply source when the pressure in the system exceeds a predetermined maximum.

The main operating valves of the system including the bypassing valve and the check valve, in accordance with the present invention, are so constructed that they need not be machined to close tolerances, but instead effect sealing engagement by means of one or more rubber rings disposed in grooves either in the valve or valve seat which coact with the complemental element of the valve in order to prevent leakage between the elements. The use of such ring-sealed valves in the system greatly facilitates the production of the entire unloading valve, inasmuch as it does away with expensive machining operations and permits a more convenient arrangement of the elements of the valve.

For a better understanding of the present invention, reference may be had to the accompanying drawing, in which:

Figure 1 is an end view of the valve embodying the present invention;

Figure 2 is a side view of a typical form of valve embodying the invention;

Figure 3 is a view in horizontal cross-section of the valve taken on line 3—3 of Figure 1; and Figure 4 is a view in cross-section of the pressure control valve for the system.

A typical form of valve embodying the present invention includes a casing 10 of generally rectangular or box-like form provided with an inlet 11 at one end thereof, a return coupling 12 at one side thereof and a coupling 13 to be connected with the hydraulic system at another side thereof. The casing 10 is provided with a bore 14 extending entirely through the casing from one end thereof to the other forming a continuation of the inlet 11.

As shown in Figure 3, the right-hand portion of the bore 14 is provided with internal threads 15 permitting the inlet to be coupled with a conduit which is connected with the source of fluid pressure, such as a pump (not shown). To the left of the threaded portion of the bore 14 is a bore section 16 of reduced diameter. The bore section 16 communicates with a larger bore section 17 providing a shoulder 18 between the bore sections 16 and 17. At the left-hand end of the bore section 17 is an enlarged bore section 19 providing a shoulder 20 therebetween. The left-hand end of the bore section 19 is provided with internal threads 21 for receiving a closure plug 22 which is threaded thereinto and is sealed by means of a resilient packing ring 23 received in a recess 22a in the plug 22. A flange 22b on the plug abuts the end of the casing 10.

At a right angle to the bore 14 is a second bore 24 which communicates with the bore 14 through a passage 25 of reduced area, thereby forming a shoulder 26 between the bore 24 and the bore 14. The shoulder 26 forms the seat for a check valve plug 27 of disc-like formation having a valve stem 27a that is received in a bushing 28 mounted on a spider 29 at the inner end of the coupling 13. The coupling 13 consists of a sleeve member provided with external threads 13a which are threaded into a threaded portion of the casing 10 adjacent the lower end of the bore 24. The coupling sleeve 13 is sealed to the casing by means of a resilient ring gasket 30 received in a recess 10a in the casing 10 and above a flange 13b on the coupling sleeve 13.

A spring 27b is interposed between the back of the check valve plug 27 and the spider 29 and normally urges the valve plug against the shoulder 26.

The seat portion of the shoulder 26 need not be machined to a fluid-tight engagement with the surface of the valve plug 27 inasmuch as proper sealing relationship is attained by means of a rubbery ring 31 that is mounted in and is of slightly greater thickness than the depth and width of an annular groove 26a in the shoulder. The groove 26a is so disposed that the edge of the valve plug 27 at least partially overlies the groove and engages the ring 31.

A check valve of the type described generally above is disclosed in my copending application Serial No. 506,948, filed October 20, 1943. As described in that application, sealing engagement between the valve plug and the seat is effected by the pressure of the liquid on the back of the plug and upon the rubber ring which compresses the ring into tight sealing engagement with the walls of the groove and the face of the valve plug, thereby preventing leakage at substantially any and all operating pressures.

The casing 10 is provided with a third bore 32 extending parallel or substantially parallel to the bore 14 and at a right angle to the bore 13. This bore communicates with the bore 24 through a small passage 33 through which liquid can flow when the valve plug 27 is displaced from the seat 26. The bore 32 receives the elements forming the pressure responsive valve that controls the fluid pressure in the hydraulic system.

At the right-hand end of the bore is an annular member 34 provided with a small central passage 35 defining an annular shoulder 34a that forms a seat for a ball valve 37. As illustrated, the bore 35 may be flared at its right-hand end in order to permit communication with the passage 33. The ring member 34 may also be provided with a peripheral groove 34b for receiving a rubbery ring 38 to effect a seal between the wall of the bore 32 and the ring 34.

Abutting the left-hand surface of the ring 34 is an annular spacer element 39 which is generally L-shaped in cross-section and is provided with one or more radial passages 39a. The spacer member 39 maintains a predetermined spacing between the ring member 34 and a sleeve 40 which is provided with a centrally located port 40a that defines a shoulder forming another valve seat 40b for the ball 37.

As shown particularly in Figure 4, the diameter of the port 40a is somewhat larger than the diameter of the passage 35 in order to control the range of pressures in the system, as will be described presently. The sleeve 40 is retained against the spacer member 39 by means of an externally threaded sleeve 41 and a lock sleeve 42, both threaded into the threaded portion 32a of the bore 32.

Escape of fluid outside the sleeve 40 is prevented by means of a rubbery ring 43 supported in a groove 40c in the sleeve 40. The sleeve 40 is further provided with an annular groove 40d therein which communicates with a space outwardly of the spacer member 39 by means of one or more longitudinally extending grooves 40e.

Within the sleeves 40, 41 and 42 is disposed a plunger 44 having a reduced end portion 44a that engages the ball 37. The plunger 44 is urged to the right, thereby forcing the ball 37 against the seat 34a by means of a spring 45 which engages a flange 44b on the plunger and an abutment washer 46 carried by a threaded sleeve 47. The threaded sleeve 47 is threaded into the threaded portion 32a of the bore 32 and can be adjusted along the bore in order to vary the pressure applied by means of the spring 45. The plunger extends through the sleeve 47 and is sealed thereto by means of a rubbery ring 48 that is disposed behind the washer 46 and in front of an annular flange 47a in the interior of the sleeve 47.

The adjustment sleeve 47 is sealed to the casing 10 by means of a compressible gasket 49 interposed between a nut 47b on the member 47 and a shoulder 32c at the left-hand end of the bore. Inasmuch as the gasket 49 is compressible, endwise adjustment of the sleeve 47 to vary the compression of the spring 45 is possible without loss of sealing engagement.

The groove 40d in the member 40 communicates with the left-hand end of the bore section 19 adjacent the plug 22 by means of a conduit 50 so that fluid passing by the ball 37 can escape into the casing section 19 which is the cylinder for a piston disc 51 forming one element of a control valve assembly. The piston 51 is connected by a stem 52 to a disc member 53 having an annular groove 53a in its periphery for receiving a rubbery sealing ring 54 that engages the walls of the bore section 17 and thereby prevents leakage of fluid past the member 53. The member 53 is also provided with a stem 55 which connects it rigidly with a disc-like valve plug 56 having an annular groove 56a therein for receiving a rubbery sealing ring 57. When the valve 56 is disposed partially within the bore portion 16 so that the ring 57 can engage the wall of the bore portion 16, sealing engagement is effected and escape of fluid from the right-hand end of the bore 14 into the bore portion 16 is prevented. When the piston 51 is displaced to the right by fluid supplied behind the piston 51, the valve plug 56 is forced out of the bore portion 16, thereby permitting fluid to escape directly into this portion and out through the return passage 12a which intersects the bore portion 16 between its ends and communicates with the coupling 12.

The return passage 12a communicates with a space 58 in the bore 32 between a wall of the bore 32 and a portion 41b of reduced thickness on the sleeve 41. This reduced portion 41b is provided with one or more radial passages 41c that permit the escape of fluid through the port 40a past the plunger 44 and through the passage 59 into the return passage 12a.

The piston 51 is normally urged to the right by means of a spring 60 bearing against the base of the piston and the shoulder 20.

Having described the structural features of the typical form of unloading valve embodying the invention, a cycle of operation of the valve will now be described.

When the valve is connected in a suitable hydraulic system and fluid under pressure is supplied to the supply coupling 11 and the bore 14, the check valve plug 27 is displaced so that the fluid can pass to the system through the coupling 13. At the same time, fluid passes through the passage 31 and comes into contact with the ball 37. As the pump continues to operate and pressure is built up in the system, a pressure will be attained in the system which is sufficient to overcome the action of the spring 45 which may be of sufficient strength to resist a pressure of, for example, 1000 pounds per square inch applied to the portion of the ball 37 exposed through the port 35. When this pressure is exceeded slightly, the ball is displaced from the seat 34a, compressing the spring 45 and forcing the ball against the seat formed by the port 40a. Inasmuch as the port 40a is larger than the diameter of the port 35, the effective area of the ball on which the pressure acts is increased and the ball is forced against the seat formed by the port 40a with increased pressure tending to retain the ball on the seat. When the ball is so displaced, the fluid can pass through the port 39a along the groove 40e, into the channel 40d, along the passage 50, thereby acting upon the piston 51 and displacing the piston, together with the valve plug 56 to the right, inasmuch as the piston 51 is of greater area than the plug 56. When the plug 56 is displaced to the right, fluid can pass directly from the bore 14 into the return bore 12a, thereby reducing the pressure on the upstream side of the check valve plug 27 and permitting this valve to close. This condition will remain until the fluid pressure in the system drops below a predetermined minimum which is controlled by the relative sizes of the ports 35 and 40a. For example, these ports may be so related in size that 100 pounds drop in pressure on the system side of the valve may be required to permit the spring 45 to displace the ball from the seat containing the passage 40a and causing it to engage the seat containing the passage 35. When this condition is attained, the piston 51 and the valve plug 56 are then moved to the left by means of the spring 60, forcing the liquid outwardly through the passage 50, the ports 39a, the port 40a through the sleeve 41, the port 41c and through the passage 59 into the return line 12. Direct communication between the inlet 14 and the return line 12a, therefore, is cut off so that the liquid under pressure again displaces the check valve plug 27 and causes the pressure in the system to build up to the maximum predetermined pressure before the cycle is repeated.

Unloading valves of the type described above can be adjusted to maintain a desired pressure operating range by varying the compression of the spring 45 and by varying the relative sizes of the ports 35 and 40a.

These valves are substantially foolproof inasmuch as close fits between the elements of the return valve and the check valve are not required. Moreover, the various valve elements of the unloading valve can be formed of materials which are readily available and without the necessity of precision machining operations in order to cause them to function effectively. For example, the casing can be formed by casting with the various bores therein formed roughly therein and then machined to the desired dimensions. The elements of the check valve and pressure release valve 56 need not be machined to close tolerances and can be formed of substantially any desired type of material capable of withstanding the pressure utilized in the system. Thus, the valves embodying the present invention can be made of aluminum, magnesium, the strong plastics or substantially any other type of sturdy material available, inasmuch as wear on these parts is reduced to a minimum by the use of the rubber sealed valves. Accordingly, it will be understood that valves of the type embodying the present invention are much less expensive than prior types of unloading valves and can be manufactured more easily than prior types of unloading valves. It will be understood, of course, that the size and shape of the various elements may be varied, depending upon the requirements, and that the structural details of the valve may be modified considerably without departing from the invention.

Accordingly, it should be understood that the above-described embodiment of the invention is illustrative and should not be considered as limiting the scope of the following claims.

I claim:

1. A valve for high pressure hydraulic systems comprising a casing having a bore therein, said bore having in end to end alignment a first bore portion, a second bore portion of smaller diameter than said first portion, a third bore portion of larger diameter than said second bore portion, and a fourth bore portion of larger diameter than said third bore portion, said fourth bore portion forming a cylinder, and said first bore portion being adapted to be connected with a source of liquid under pressure, a liquid return line communicating with said second bore portion, a piston in and slidable axially of said cylinder, a valve plug having a peripheral groove therein connected to said piston and movable therewith into and out of said second bore portion, a rubbery ring in said groove for sealing engagement with said plug and said second bore portion, a member having a peripheral groove therein fixed to and spaced from said valve plug and disposed in said third bore portion and a rubbery sealing ring in the last mentioned peripheral groove in sealing relation to said member and said bore for preventing communication between said second bore portion and said cylinder.

2. A valve comprising a casing having a bore therein, said bore having in end to end alignment a first bore portion, a second smaller diameter bore portion, a third bore portion having a diameter larger than said second bore portion, a fourth bore portion having a diameter larger than said third bore portion, means for connecting said first bore portion to a source of liquid under pressure and to an hydraulic system, means closing one end of the fourth bore portion to form a cylinder, a piston in and movable axially of said cylinder, means for supplying fluid to said cylinder for moving said piston, a valve plug connected to and movable with said piston between a position at least partially in said second bore and a position in said first bore portion, means forming a peripheral groove in said valve plug, a rubbery ring in said groove for sealing engagement with said plug and said smaller bore portion, means forming a liquid return bore intersecting said second bore portion, and a sealing member having a peripheral rubbery sealing ring connected to and movable with said valve plug disposed in said third bore portion for preventing direct communication between said cylinder and said second bore portion.

BENJAMIN N. ASHTON.

REFERENCES CITED

The following references are of record in the file of this patent:

UNITED STATES PATENTS

| Number | Name | Date |
|---|---|---|
| 83,899 | Allison | Mar. 10, 1868 |
| 331,789 | Harvey | Dec. 8, 1885 |
| 852,802 | Sears | May 7, 1907 |
| 931,798 | Pierce | Aug. 24, 1909 |
| 1,077,795 | Bruns | Nov. 4, 1913 |
| 1,165,616 | Mellen | Dec. 28, 1915 |
| 1,205,898 | Jones | Nov. 1, 1916 |
| 1,313,889 | Ford | Aug. 26, 1919 |
| 1,373,599 | Clark | Apr. 5, 1921 |
| 1,634,672 | Mallory | July 5, 1927 |
| 2,264,375 | Hill | Dec. 2, 1941 |
| 2,296,145 | Christensen | Sept. 15, 1942 |
| 2,316,445 | Marshall | Apr. 13, 1943 |
| 2,417,242 | Eckel | Mar. 11, 1947 |